(12) United States Patent
Gooch et al.

(10) Patent No.: US 12,396,534 B2
(45) Date of Patent: Aug. 26, 2025

(54) MULTI-MATERIAL LENS PACKAGE

(71) Applicant: Johnson & Johnson Vision Care, Inc., Jacksonville, FL (US)

(72) Inventors: William Gooch, Jacksonville, FL (US); Timothy Burkill, Limerick (IE); Scott F. Ansell, Ponte Vedra Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 17/934,286

(22) Filed: Sep. 22, 2022

(65) Prior Publication Data

US 2023/0113243 A1 Apr. 13, 2023

Related U.S. Application Data

(60) Provisional application No. 63/253,958, filed on Oct. 8, 2021.

(51) Int. Cl.
| | |
|---|---|
| *A45C 11/00* | (2006.01) |
| *B29C 45/16* | (2006.01) |
| *B29K 23/00* | (2006.01) |
| *B29K 105/26* | (2006.01) |
| *B29L 31/00* | (2006.01) |

(52) U.S. Cl.
CPC ............ *A45C 11/005* (2013.01); *B29C 45/16* (2013.01); *B29K 2023/12* (2013.01); *B29K 2105/26* (2013.01); *B29K 2995/002* (2013.01); *B29K 2995/0026* (2013.01); *B29L 2031/712* (2013.01)

(58) Field of Classification Search
CPC ... A45C 11/005; B29C 45/16; B29K 2023/12; B29K 2105/26; B29K 2995/002; B29K 2995/0026; B29L 2031/712

USPC .......................................................... 206/5.1
See application file for complete search history.

(56) References Cited

U.S. PATENT DOCUMENTS

| | | | |
|---|---|---|---|
| 289,923 A | 12/1883 | Hoogesteger | |
| 3,408,429 A | 10/1968 | Otto | |
| 3,660,545 A | 5/1972 | Wichterle | |
| 3,678,633 A | 7/1972 | Block | |
| 3,808,178 A | 4/1974 | Gaylord | |
| 3,955,726 A | 5/1976 | Reitzel | |

(Continued)

FOREIGN PATENT DOCUMENTS

| | | |
|---|---|---|
| DE | 69422683 T2 | 6/2000 |
| DE | 60011926 T2 | 8/2004 |

(Continued)

OTHER PUBLICATIONS

"Compendium of Polymer Terminology and Nomenclature: IUPAC Recommendations", edited by: Richard G. Jones, Jaroslav Kahovec, Robert Stepto, Edward S. Wilks, Michael Hess, Tatsuki Kitayama, and W. Val Metanomski, 8 pages, 2008.

(Continued)

*Primary Examiner* — Jacob K Ackun
(74) *Attorney, Agent, or Firm* — Karen A. Harding

(57) ABSTRACT

There is described a contact lens package containing a bowl for holding a contact lens and a flange around the bowl which may be made from a different polymer material than the bowl. The packages comprise at least one interface tab with at least one slot so that the second polymer material forming the flange can encapsulate the tab providing a mechanical interlock displaying good flexural strength.

51 Claims, 4 Drawing Sheets

(56) References Cited

U.S. PATENT DOCUMENTS

| | | |
|---|---|---|
| 4,113,224 A | 9/1978 | Clark et al. |
| 4,120,570 A | 10/1978 | Gaylord |
| 4,136,250 A | 1/1979 | Mueller et al. |
| 4,153,641 A | 5/1979 | Deichert et al. |
| 4,197,266 A | 4/1980 | Clark et al. |
| 4,399,093 A | 8/1983 | Kirby et al. |
| 4,436,887 A | 3/1984 | Chromecek et al. |
| 4,495,313 A | 1/1985 | Larsen |
| 4,659,782 A | 4/1987 | Spinelli |
| 4,659,783 A | 4/1987 | Spinelli |
| 4,691,820 A | 9/1987 | Martinez |
| 4,740,533 A | 4/1988 | Su et al. |
| 4,889,664 A | 12/1989 | Kindt-larsen et al. |
| 4,910,277 A | 3/1990 | Bambury et al. |
| 4,948,856 A | 8/1990 | Minchak et al. |
| 5,006,622 A | 4/1991 | Kunzler et al. |
| 5,034,461 A | 7/1991 | Lai et al. |
| 5,039,459 A | 8/1991 | Kindt-Larsen et al. |
| 5,070,215 A | 12/1991 | Bambury et al. |
| 5,194,544 A | 3/1993 | Goldberg et al. |
| 5,224,593 A | 7/1993 | Bennett |
| 5,236,969 A | 8/1993 | Kunzler et al. |
| 5,244,981 A | 9/1993 | Seidner et al. |
| 5,270,418 A | 12/1993 | Kunzler et al. |
| 5,298,533 A | 3/1994 | Nandu et al. |
| 5,314,960 A | 5/1994 | Spinelli et al. |
| 5,331,057 A | 7/1994 | Brekner et al. |
| 5,331,067 A | 7/1994 | Seidner et al. |
| 5,371,147 A | 12/1994 | Spinelli et al. |
| 5,383,550 A | 1/1995 | Tsao |
| 5,433,314 A | 7/1995 | Lin |
| 5,468,803 A | 11/1995 | Takahashi et al. |
| 5,468,819 A | 11/1995 | Goodall et al. |
| 5,620,088 A | 4/1997 | Martin et al. |
| 5,760,100 A | 6/1998 | Nicolson et al. |
| 5,776,999 A | 7/1998 | Nicolson et al. |
| 5,789,461 A | 8/1998 | Nicolson et al. |
| 5,824,719 A | 10/1998 | Kunzler et al. |
| 5,849,811 A | 12/1998 | Nicolson et al. |
| 5,962,548 A | 10/1999 | Vanderlaan et al. |
| 5,965,631 A | 10/1999 | Nicolson et al. |
| 5,998,498 A | 12/1999 | Vanderlaan et al. |
| 6,020,445 A | 2/2000 | Vanderlaan et al. |
| 6,066,374 A | 5/2000 | Healy et al. |
| 6,087,415 A | 7/2000 | Vanderlaan et al. |
| 6,090,888 A | 7/2000 | Khanarian et al. |
| 6,367,929 B1 | 4/2002 | Maiden et al. |
| 6,420,453 B1 | 7/2002 | Bowers et al. |
| 6,423,761 B1 | 7/2002 | Bowers et al. |
| 6,767,979 B1 | 7/2004 | Muir et al. |
| D496,790 S | 10/2004 | Dzwill et al. |
| 6,822,016 B2 | 11/2004 | McCabe et al. |
| 6,867,245 B2 | 3/2005 | Iwata et al. |
| 6,943,203 B2 | 9/2005 | Vanderlaan et al. |
| 6,951,894 B1 | 10/2005 | Nicolson et al. |
| 7,052,131 B2 | 5/2006 | McCabe et al. |
| 7,086,526 B2 | 8/2006 | Newman |
| 7,247,692 B2 | 7/2007 | Laredo |
| 7,249,848 B2 | 7/2007 | Laredo et al. |
| 7,348,066 B2 | 3/2008 | Chien |
| 7,396,890 B2 | 7/2008 | Zanini et al. |
| 7,461,937 B2 | 12/2008 | Steffen et al. |
| 7,468,398 B2 | 12/2008 | Nicolson et al. |
| 7,538,146 B2 | 5/2009 | Nicolson et al. |
| 7,553,880 B2 | 6/2009 | Nicolson et al. |
| 7,572,841 B2 | 8/2009 | Chen et al. |
| 7,666,921 B2 | 2/2010 | McCabe et al. |
| 7,691,916 B2 | 4/2010 | McCabe et al. |
| 7,786,185 B2 | 8/2010 | Rathore et al. |
| 7,789,223 B2 | 9/2010 | Tokarski et al. |
| 7,825,170 B2 | 11/2010 | Steffen et al. |
| 7,915,323 B2 | 3/2011 | Awasthi et al. |
| 7,934,830 B2 | 5/2011 | Blackwell et al. |
| 7,956,131 B2 | 6/2011 | Arnold et al. |
| 7,994,356 B2 | 8/2011 | Awasthi et al. |
| 8,022,158 B2 | 9/2011 | Rathore et al. |
| 8,026,326 B2 | 9/2011 | Benz et al. |
| 8,138,290 B2 | 3/2012 | Blackwell et al. |
| 8,148,472 B1 | 4/2012 | Baugh et al. |
| 8,163,206 B2 | 4/2012 | Chang et al. |
| 8,273,802 B2 | 9/2012 | Laredo et al. |
| 8,389,597 B2 | 3/2013 | Blackwell et al. |
| 8,399,538 B2 | 3/2013 | Steffen et al. |
| 8,415,404 B2 | 4/2013 | Nicolson et al. |
| 8,420,190 B2 | 4/2013 | Fujita |
| 8,420,197 B2 | 4/2013 | Giraud et al. |
| 8,420,711 B2 | 4/2013 | Awasthi et al. |
| 8,450,387 B2 | 5/2013 | McCabe et al. |
| 8,459,445 B2 | 6/2013 | Newman |
| 8,470,906 B2 | 6/2013 | Rathore et al. |
| 8,487,058 B2 | 7/2013 | Liu et al. |
| 8,507,577 B2 | 8/2013 | Zanini et al. |
| 8,568,626 B2 | 10/2013 | Nicolson et al. |
| 8,637,621 B2 | 1/2014 | Iwata et al. |
| 8,703,891 B2 | 4/2014 | Broad |
| 8,937,110 B2 | 1/2015 | Alli et al. |
| 8,937,111 B2 | 1/2015 | Alli et al. |
| 8,940,812 B2 | 1/2015 | Reboul et al. |
| 8,980,972 B2 | 3/2015 | Driver |
| 9,056,878 B2 | 6/2015 | Fujisawa et al. |
| 9,057,821 B2 | 6/2015 | Broad et al. |
| 9,119,450 B2 | 9/2015 | Lee |
| 9,125,808 B2 | 9/2015 | Alli et al. |
| 9,140,825 B2 | 9/2015 | Alli et al. |
| 9,156,934 B2 | 10/2015 | Alli et al. |
| 9,170,349 B2 | 10/2015 | Mahadevan et al. |
| 9,217,813 B2 | 12/2015 | Liu et al. |
| 9,244,196 B2 | 1/2016 | Scales et al. |
| 9,244,197 B2 | 1/2016 | Alli et al. |
| 9,260,544 B2 | 2/2016 | Rathore et al. |
| 9,297,928 B2 | 3/2016 | Molock et al. |
| 9,297,929 B2 | 3/2016 | Scales et al. |
| 9,340,652 B2 | 5/2016 | Kunimoto |
| 9,358,736 B2 | 6/2016 | Wang et al. |
| 9,452,593 B2 | 9/2016 | Tatarka et al. |
| 9,656,416 B2 | 5/2017 | Takatsugi et al. |
| 10,004,309 B2 | 6/2018 | Ansell |
| 10,246,235 B2 | 4/2019 | Sebald |
| 10,578,890 B1 | 3/2020 | Cheslock |
| 10,618,257 B2 | 4/2020 | Suzuki et al. |
| 10,661,964 B2 | 5/2020 | Tokarski et al. |
| 10,696,463 B2 | 6/2020 | Swamy |
| 10,842,787 B2 | 11/2020 | Ostrow et al. |
| 2002/0197478 A1 | 12/2002 | Muggli et al. |
| 2004/0134005 A1 | 7/2004 | Pankow et al. |
| 2004/0236024 A1 | 11/2004 | Rivett et al. |
| 2005/0047991 A1 | 3/2005 | Rees et al. |
| 2005/0205451 A1 | 9/2005 | Brown-skrobot |
| 2006/0102496 A1 | 5/2006 | Christy et al. |
| 2008/0017525 A1 | 1/2008 | Newman |
| 2008/0137076 A1 | 6/2008 | Clements et al. |
| 2009/0078669 A1 | 3/2009 | Sakaguchi et al. |
| 2010/0048847 A1 | 2/2010 | Broad |
| 2010/0090181 A1 | 4/2010 | Wehefritz |
| 2010/0106128 A1 | 4/2010 | Mao et al. |
| 2010/0204523 A1 | 8/2010 | Tominaga et al. |
| 2012/0006695 A1 | 1/2012 | Kawai |
| 2012/0040129 A1 | 2/2012 | Tseng et al. |
| 2012/0267262 A1 | 10/2012 | Wang et al. |
| 2013/0180212 A1 | 7/2013 | Wang et al. |
| 2014/0194024 A1 | 7/2014 | Pham |
| 2015/0174084 A1 | 6/2015 | Kaufmann et al. |
| 2016/0198825 A1 | 7/2016 | Fawdington |
| 2018/0137076 A1 | 5/2018 | Shao et al. |
| 2018/0356558 A1 | 12/2018 | Ochrombel |
| 2019/0271798 A1 | 9/2019 | Mahadevan et al. |
| 2020/0114603 A1 | 4/2020 | Chen et al. |
| 2020/0229561 A1* | 7/2020 | Almond ............ A45C 11/005 |
| 2020/0229562 A1* | 7/2020 | Almond ............ A45C 11/005 |
| 2020/0229563 A1* | 7/2020 | Almond ............ B65D 75/366 |
| 2021/0396911 A1 | 12/2021 | Miller et al. |

(56) References Cited

U.S. PATENT DOCUMENTS

| | | |
|---|---|---|
| 2023/0110394 A1 | 4/2023 | Gooch et al. |
| 2023/0276917 A1 | 9/2023 | Popwell et al. |

FOREIGN PATENT DOCUMENTS

| | | |
|---|---|---|
| EP | 0080539 B1 | 5/1986 |
| EP | 1930243 A1 | 6/2008 |
| EP | 2537868 A1 | 12/2012 |
| EP | 2043478 B1 | 11/2014 |
| EP | 2803713 A1 | 11/2014 |
| EP | 3520984 B1 | 3/2021 |
| EP | 3805117 A1 | 4/2021 |
| KR | 20130123812 A | 11/2013 |
| KR | 1343713 B1 | 12/2013 |
| WO | 98/21995 A1 | 5/1998 |
| WO | 0136291 A1 | 5/2001 |
| WO | 2003022321 A2 | 3/2003 |
| WO | 2008061992 A2 | 5/2008 |
| WO | 2012017984 A1 | 2/2012 |
| WO | 2014095837 A1 | 6/2014 |
| WO | 2019223910 A1 | 11/2019 |

OTHER PUBLICATIONS

Crivello, et al., "Photoinitiators for Free Radical Cationic &amp; Anionic Photopolymerisation", In 2nd Edition, vol. III, pp. 275-298, 1998.

PCT International Search Report, dated Dec. 14, 2022, for PCT Int'l Appln. No. PCT/IB2022/059508.

PCT International Search Report, dated Aug. 8, 2006, for PCT Int'l. Appln. No. PCT/US2006/011438.

PCT International Search Report, dated Feb. 20, 2023, for PCT Int'l. Appln. No. PCT/IB2022/059504.

PCT International Search Report, dated Feb. 25, 2020, for PCT Int'l. Appln. No. PCT/IB2019/060672.

PCT International Search Report, dated Mar. 1, 2021, for PCT Int'l Appln. No. PCT/IB2020/061498.

Shin et al, Chemical Structure and Physical Properties of Cyclic Olefin Copolymers (IUPAC Technical Report), Pure and Applied Chemistry, vol. 77, No. 5, pp. 801-814, 2005.

Suzuki et al., Introduction to Cyclo Olefin Polymer (COP)—Key Properties Update, (2016) p. 1.

U.S. Appl. No. 10/028,400, filed Dec. 20, 2001 (132 pages).

U.S. Appl. No. 10/029,526, filed Dec. 21, 2001 (41 pages).

U.S. Appl. No. 16/398,722, filed Apr. 30, 2019 (87 pages).

U.S. Appl. No. 16/548,204, filed Aug. 22, 2019 (77 pages).

U.S. Appl. No. 60/428,620, filed Nov. 22, 2002 (74 pages).

Yamazaki et al., Industrialization and application development of cyclo-olefin polymer, Journal of Molecular Catalysis A: Chemical, 2004, pp. 81-87, vol. 213.

Zeon Corporation, About Zeon, Zeonex.com, Oct. 18, 2017, 2 pages, https://www.zeonex.com/about.aspx.html.

Zeon Corporation, Zeon COP (Cyclo Olefin Polymer), Zeonex Injection Molding Guide, Aug. 2013, pp. 1-16, 0813002(SE).

Zeon Corporation, Zeon Cyclo-olefin polymers (COP), Zeonor General-Purpose Engineering Plastics, Oct. 18, 2017, pp. 1-4, Oct. 2017.

Zeon Corporation, Zeon Safety Data Sheet, Zeonor 1060R, Apr. 11, 2017, 8 pages, Z02812.

International Preliminary Report on Patentability for PCT/IB2022/059508 dated Dec. 12, 2023.

International Preliminary Report on Patentability for PCT/IB2022/059504 dated Apr. 9, 2024.

Final Office Action received for U.S. Appl. No. 17/934,280, mailed on Jul. 12, 2024, 17 pages.

Non-Final Office Action received for U.S. Appl. No. 17/934,280, mailed on Oct. 4, 2024, 6 pages.

Non-Final Office Action, received for U.S. Appl. No. 17/934,280, mailed on Oct. 13, 2023, 31 pages.

Non-Final Office Action received for U.S. Appl. No. 17/934,280, mailed on Mar. 25, 2024, 17 pages.

* cited by examiner

MULTI-MATERIAL LENS PACKAGE

RELATED APPLICATIONS

This application claims priority to U.S. Provisional Patent Application Ser. No. 63/253,958, filed Oct. 8, 2021, which is incorporated herein by reference in its entirety.

BACKGROUND OF THE INVENTION

Soft contact lenses are generally sold in a sealed sterile container often referred to as a blister package. The blister package has a plastic base with a well in which the contact lens and packing solution are housed, surrounded by a flange region which allows for sealing the base to a peelable film. The user opens the blister package by peeling the film away from the base.

The blister bowl must not interact with either the contact lens solution or contact lens, and thus generally cannot be made from recycled or colored materials, even though such materials could be environmentally sustainable or provide more distinctive packaging respectively. For lenses and packaging solutions with additional components such as wetting agents, pharmaceuticals and nutraceuticals, the portions of the plastic base must not absorb the additional components. However, many common packaging plastics like polypropylene can absorb such additional components. Plastic bases made from materials which do not absorb such additional components, such as cyclic olefin polymer materials and copolymer materials, have been proposed, but such materials can be expensive and difficult to mold.

U.S. Pat. No. 8,459,445 discloses a contact lens blister package including a color component. The color component is included in a core material, which is coated with a barrier material coating. While this allows creating a package in which the flange and bowl are coated, it does not disclose contact lenses where the bowl remains clear and the flange is colored. It also does not disclose packages where the bowl can be made from one material and the flange another. U.S. Pat. No. 8,420,197 discloses using structural interlocks to mold articles from dissimilar mold materials. The structural interlocks are formed by creating an interlock cavity in the first material and filling the cavity with the second material. While the structural interlocks of U.S. Pat. No. 8,420,197 provide interlocks that provide good strength against lateral pull force, the interlocks can break upon imposition of flexural stress, such as would occur at the joint between a contact lens package bowl and flange, particularly upon opening. Thus, there remains a need for improved contact lens packages made from more than one material, including materials which do not readily bond together.

SUMMARY OF THE INVENTION

The present invention relates to packages used by consumers of contact lenses. More specifically, the present package allows the use of different materials in making a contact lens package so that different materials can be used for different parts of the package base, such as the bowl which holds the contact lens and packing solution and the flange, which surrounds the bowl. This attribute provides contact lenses packages that are sterile, do not interact with the lens or packing solution, and allows for greater flexibility in creating contact lens packages with desirable properties. The present invention further relates to contact lens packages where the bowl is formed from one polymeric material, and the flange is formed from another polymeric material which is capable, during the injection molding process, of thermally bonding directly to the bowl polymer material.

The present invention further relates to a package comprising:
    a package base comprising a bowl comprising
        a well for holding a lens,
        a well edge, a heat seal region outside the well edge and a peripheral edge outside the heat seal region, the bowl having at least one bonding tab along at least a portion of the peripheral edge; and
    a flange comprising a bonding overlay which is durably thermally bonded to the interface tab at an interface.

The present invention further relates to a process for forming a contact lens package comprising
    injection molding a bowl from a bowl polymer material, the bowl comprising
    a well for holding a lens,
    a well edge, a heat seal region outside the well edge and a peripheral edge outside the heat seal region, the bowl having at least one bonding tab along at least a portion of the peripheral edge; and
    injection molding a flange from a flange polymer material such that the flange polymer material contacts the interface tab forming a bonding overlay which is durably thermally bonded to the interface tab at an interface.

The Summary and Abstract sections may set forth one or more but not all exemplary embodiments of the present invention as contemplated by the inventors, and thus, are not intended to limit the present invention and the appended claims in any way.

DESCRIPTION OF THE INVENTION

Figure 1:
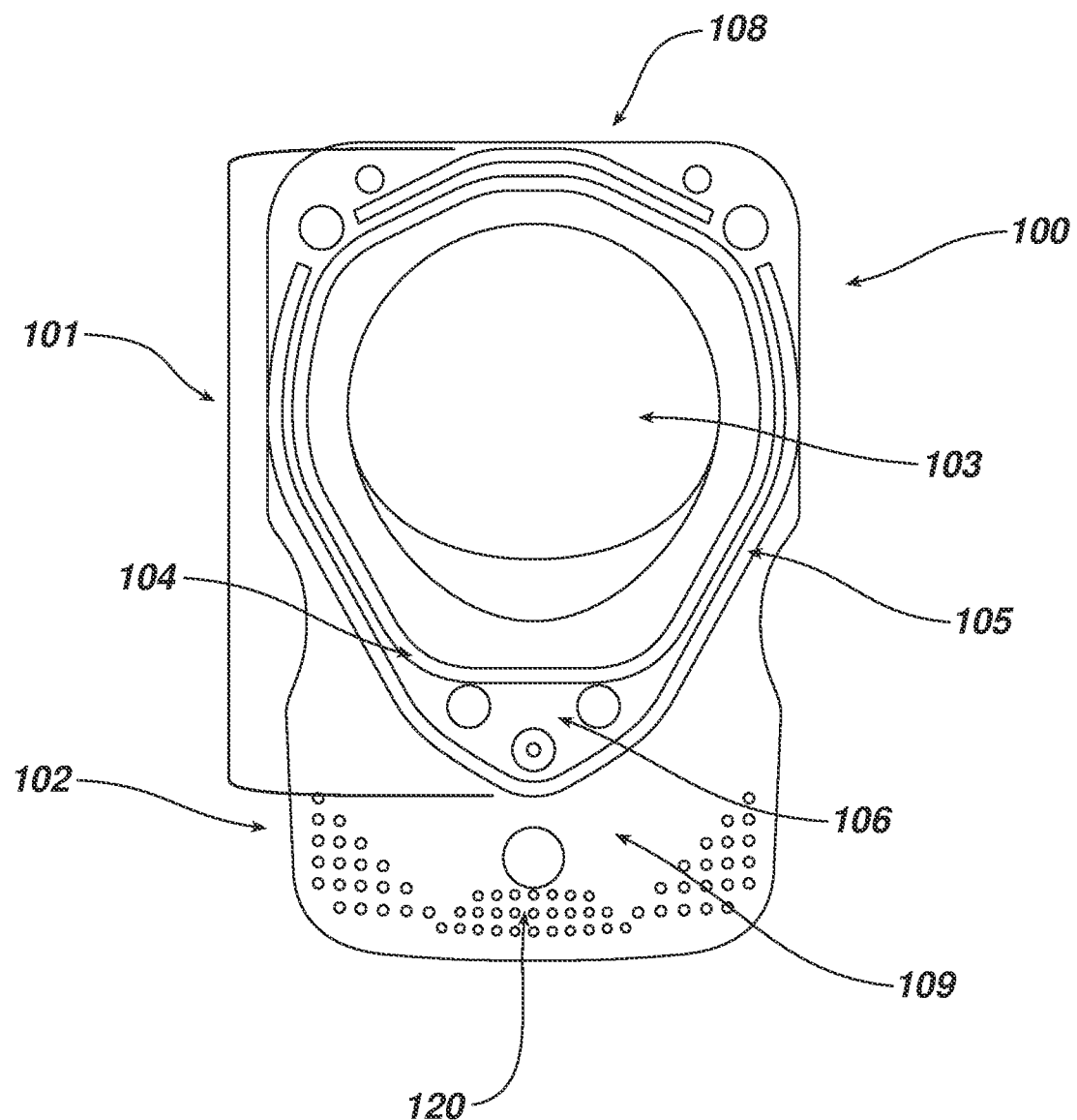
FIG. 1 is a top view drawing of the base portion of a contact lens package.

Reference will now be made in detail to representative embodiments illustrated in the accompanying drawings wherein reference numerals indicate certain elements. The following descriptions are not intended to limit the myriad embodiments to those specifically described. To the contrary, it is intended to cover alternatives, modifications, and equivalents as can be included within the spirit and scope of the described embodiments as defined by the appended claims.

References to "one embodiment," "an embodiment," "some embodiments," "an example embodiment," etc., indicate that the embodiment described may include a particular feature, structure, aspect, or characteristic, but every embodiment may not necessarily include the particular feature, structure, or characteristic. Moreover, such phrases are not necessarily referring to the same embodiment. Further, when a particular feature, structure, aspect, or characteristic is described in connection with an embodiment, it is submitted that it is within the knowledge of one skilled in the art to affect such feature, structure, or characteristic in connection with other embodiments whether or not explicitly described.

The phraseology or terminology used herein is for the purpose of description and not of limitation, such that the terminology or phraseology of the present specification is to be interpreted by the skilled artisan in light of the teachings and guidance.

There is a growing desire to create contact lenses packages which are tailored to particular lens types or customers, especially since the variety of contact lenses materials and functionality are expanding. Contact lenses containing light absorbing materials such as photochromic compounds and UV or visible light absorbing contact lenses (for example blue blocking contact lenses) are becoming available. Contact lenses that change or enhance the appearance of the lens wearer's eyes (beauty lenses) are also common. Improving the sustainability of contact lens packaging, for example by including recycled polymers, would also be desirable. However, colorants and recycled polymers cannot contact the contact lens and therefore cannot be included in the bowl of the contact lens directly. Contact lenses packed with additives, such as pharmaceutical agents, nutraceutical agents and wetting agents have also been proposed. Some of these additives can interact with conventional packaging materials, including polypropylene, reducing the concentration of the active ingredient in the contact lens. However, it may not always be desirable to make the entire primary package out of specialty materials, and such specialty materials may not thermally bond to conventional materials such as polypropylene.

The present invention provides injection molded packages formed from at least two thermally bondable materials. As used herein, thermally bondable means that the first and second polymer materials form a durable thermal bond during the injection molding process. The polymer materials may be entirely different polymer materials, blends having different components (for example where one polymer material is a clear polymer material such as polypropylene and the other material is colored polypropylene); blends having different concentrations of the same polymer material components or the same polymer material with different impurity profiles (such as for example using virgin polymer material for one polymer material and a second polymer material comprising recycled polymer material) so long as a durable thermal bond is created during sequential or multistep molding. By decoupling the molding of the bowl from the flange, and providing a durable injection molded interface between the bowl and the flange the present invention provides the designer of contact lens primary packages with an increased range of options to design and manufacture primary packages with a wide range of benefits.

The following terms are used in the present specification.

"Inert" means a component or material is non-reactive during the manufacture and use of the package.

"Lidstock" is a flexible film or sheet which is heat sealed to the base portion of the package to form a sealed cavity. Lidstock is generally multilayered and comprises a support layer and a peelable seal layer. The lidstock may further comprise additional layers including print layers, lamination layers, foil layers and combinations thereof and the like.

"Durable injection molded interface" and "durable thermal bond" means a thermal bond between multishot molded first and second polymer materials which is strong enough to provide a bond, without physical interlock features or separate adhesives, that will not separate during the removal of thermally sealed lidstock from the base portion of the package. Force upon lidstock removal is concentrated at the front of the package and as used herein separate means that less than about 50%, about 40%, about 30%, about 20% or about 10% of the bond at the interface along the front of the package separates. In some embodiments no separation occurs upon opening.

"Pharmaceutical agent" means any compound used to diagnose, cure, treat, or prevent disease. "Ophthalmic pharmaceutical agent" means any compound used to diagnose, cure, treat, or prevent disease or conditions of the ocular system, including the eye and eyelids. Examples of ophthalmic pharmaceutical agents include antibacterial compounds, antiallergic agents, anti-inflammatories, miotics, compounds which treat dry eye, glaucoma, or slow or prevent the progression of myopia or presbyopia.

The term "light absorbing compound" refers to a chemical material that absorbs light within the visible spectrum (e.g., in the 380 to 780 nm range). A "high energy radiation absorber," "UV/HEV absorber," or "high energy light absorbing compound" is a chemical material that absorbs various wavelengths of ultraviolet light, high energy visible light, or both. A material's ability to absorb certain wavelengths of light can be determined by measuring its UV/Vis transmission or absorbance spectrum.

The terms "high energy visible light absorbing," "HEV light absorbing" or similar terms refer to contact lenses that limit transmission of one or more wavelengths of high energy visible light through the lens, for instance in the range of 400 to 450 nm.

"Ultraviolet" or "UV absorbing compounds" absorbs light within the ultraviolet spectrum (e.g., in the 280 to 400 nm range). Examples of UV absorbing compounds include benzophenones, benzotriazoles and substituted acrylonitriles.

A material's ability to absorb certain wavelengths of light can be determined by measuring its UV/Vis transmission spectrum. Materials that exhibit no absorption at a particular wavelength will exhibit substantially 100 percent transmission at that wavelength. Conversely, materials that completely absorb at a particular wavelength will exhibit substantially 0% transmission at that wavelength. When included in the polymer material used to form the bowl the concentration of any light absorbing compound can be selected to provide a percent absorption sufficient to protect the lens and its components, packing solution additives or both. Percent absorption of about 20%, 30%, 50%, 70% or more of the desired wavelengths may be suitable. When included in the bowl the concentration of any light absorbing compound can be selected not to interfere with inline metrology.

Photochromic materials are those which reversibly darken upon exposure to specific intensities and wavelengths of light.

The terms "photostabilize," "photostabilized," or similar expressions mean that a contact lens containing a photosensitive light absorbing compound, as described herein, is protected against photodegradation such that it exhibits less change in average transmission over the wavelength range of 400 to 450 nm, following exposure under ICH guideline Q1B conditions as described above, than would be exhibited in the absence of the protection. The change in average transmission may be at least about 5% or about 10% less than the same lens without photostabilization. The exposure may be conducted under the ICH Photostability Guideline using an Option 2 light source with an estimated illuminance exposure of $1.5192 \times 10^6$ Lux hours (168.8 hours exposure time) and an estimated ultraviolet irradiation exposure of 259.4 Watt hours/m² (16.2 hours exposure time), preferably in a photostability chamber that is controlled at 25° C./Amb RH. After exposure, the UV/Vis spectrum of the sample is collected and compared to the spectrum of a sample that has been protected from exposure. By way of example, contact lenses which are not photostabilized and contain at least one photosensitive light absorbing compound, exhibit, after exposure to light under ICH guideline Q1B conditions (sometimes shortened herein to "ICH guideline Q1B" or "Q1B conditions") as described above, at least about 2%, at least about 5%, at least about 7%, or at least about 10%, non-reversible change in their average transmission over a wavelength range of 400 to 450 nm. Such changes may be calculated as the absolute value of the difference between the average transmission (over the indicated wavelength range) with and without the light exposure.

"Environmentally sustainable" packaging means packaging that reduces the amount of materials from the package that are landfilled and/or that increases the amount of materials that are included from recycled or sustainable sources. Packaging may be made environmentally sustainable by reducing the amount of packaging needed, increasing the amount of recycled material used in a package, incorporating biodegradable material into a package or a combination thereof.

The term "lens" refers to ophthalmic devices that reside in or on the eye. These devices can provide optical correction, cosmetic enhancement, light absorption (including UV, HEV, visible light and combinations thereof) glare reduction, therapeutic effect, including preventing the progression of myopia or presbyopia, reducing the signs or symptoms of ocular pathologies, such as dry eye, or allergic conjunctivitis, wound healing, delivery of drugs or neutraceuticals, diagnostic evaluation or monitoring, or any combination thereof. The term lens includes, but is not limited to, soft contact lenses, hard contact lenses, intraocular lenses, overlay lenses, ocular inserts, and optical inserts. Contact lenses (or "contacts") are placed directly on the surface of the eyes (e.g., placed on the film of tears that covers the surface of the eyes). Contact lenses include soft contact lens (e.g., conventional or silicone hydrogel), rigid contact lenses or hybrid contact lenses (e.g., with soft skirt or shell). Contact lenses have been considered to be Class II or Class III medical devices by the FDA since 1976.

Soft contact lenses may be formed from hydrogels. Hydrogels are crosslinked polymers that absorb water. Non-limiting examples of soft contact lenses formulations include but are not limited to the formulations of etafilcon (polyHEMA, methacrylic acid copolymer material), genfilcon, hilafilcon, lenefilcon, nelfilcon, nesofilcon, omafilcon, polymacon (polyHEMA), vifilcon, acquafilcon, olifilcon, asmofilcon, balafilcon, comfilcon, delefilcon, enfilcon, efrofilcon, fanfilcon, formofilcon, galyfilcon, kalifilcon, lotrafilcon, narafilcon, riofilcon, samfilcon, sifilcon, senofilcon, somofilcon, stenfilcon, including all of their variants and the like. Contact lens formulations may be formed from etafilcon, balafilcon, acquafilcon, lotrafilcon, comfilcon, galyfilcon, senofilcon, narafilcon, asmofilcon, delefilcon, formofilcon, kalifilcon, riofilcon, samfilcon, somofilcon, stenfilcon, sifilcon, fanfilcon, and their variants, as well as silicone hydrogels, as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9,156,934, 9,170,349, 9,244,196, 9,244,197, 9,260,544, 9,297,928, 9,297,929 as well as WO 03/22321, WO 2008/061992, and US 2010/0048847.

"Silicone hydrogel contact lens" refers to a hydrogel contact lens that is made from at least one silicone-containing compound. Silicone hydrogel contact lenses generally have increased oxygen permeability compared to conventional hydrogels. Silicone hydrogel contact lenses use both their water and polymer material content to transmit oxygen to the eye.

"Packing Solution" means ophthalmically compatible solutions which are included in the package well with the contact lens. The packing solution is generally buffered, and has a pH and osmolality compatible with the human ocular surface. The packing solution may also comprise additional components including, but not limited to components which limit interactions between the lens and the package well and lidstock or components which provide a benefit when the lens is placed on the eye.

"Multishot molding" or "multishot molded" refers to processes in which parts of the package are molded in sequence or series. Multishot molding can be conducted in a single or multiple molding stations, single or multiple molding machines, which may be located in the same or a different location.

The bowl polymer material and flange polymer material are the polymer materials used to mold the bowl and flange respectively. The first and second polymer materials are the materials used for the first and second molding shots respectively. The figures show an embodiment where the first polymer material is the bowl polymer material and the second polymer material is the flange polymer material. When the flange is molded first, the flange polymer material is the first polymer material. Polymer materials describe throughout comprise at least one polymer material (which may be a homopolymer material, copolymer material or blend thereof) and may optionally comprise additives as described below.

Packages of the present invention comprise a base which is formed from at least 2 polymer materials. Referring to FIG. 1, the bowl 101, is formed from a bowl polymer material that is suitable for packaging sterile medical devices, such as lenses, contact lenses or soft contact lenses, and is inert to the packing solution and lens. The base portion 100 comprises bowl 101 and flange 102. The flange, 102, is formed from a flange polymer material that is multishot molded.

The bowl 101 comprises a well 103 for receiving a lens and packing solution, a seal region 104 where the lidstock (not shown) is sealed to the bowl. The bowl has along its peripheral edge at least one bonding tab. When the flange 102 is molded by introducing the second polymer material into the mold, the second polymer material contacts the bonding tab, and forms a durable injection molded interface. It should also be appreciated that the flange region may be molded first, and if so, the flange region would include the bonding tabs, and optional teeth described below.

To open the package, the user peels the lidstock from front 106 of the base toward the back 108 of the package. The seal between the seal region 104 of base portion 100 and the lidstock must have sufficient strength to maintain the seal which maintains sterility of the lens and solution during sterilization, shipping and storage. Peel strengths of about 0.6 to about 5.0 lbF, 1.0 to about 5.0 lbF, 1.2 to about 3.5 lbF an about 1.5 to about 3.0 lbF are common. Thus opening the package can exert substantial flexural stress on any interface between bowl 101 and flange 102. Because the user will grip the front of the flange 109 and pull the front edge of the lidstock up and toward the back of the package, the interface must be strong enough to keep the bowl from separating from the flange while the lidstock is opened.

Figure 2A:
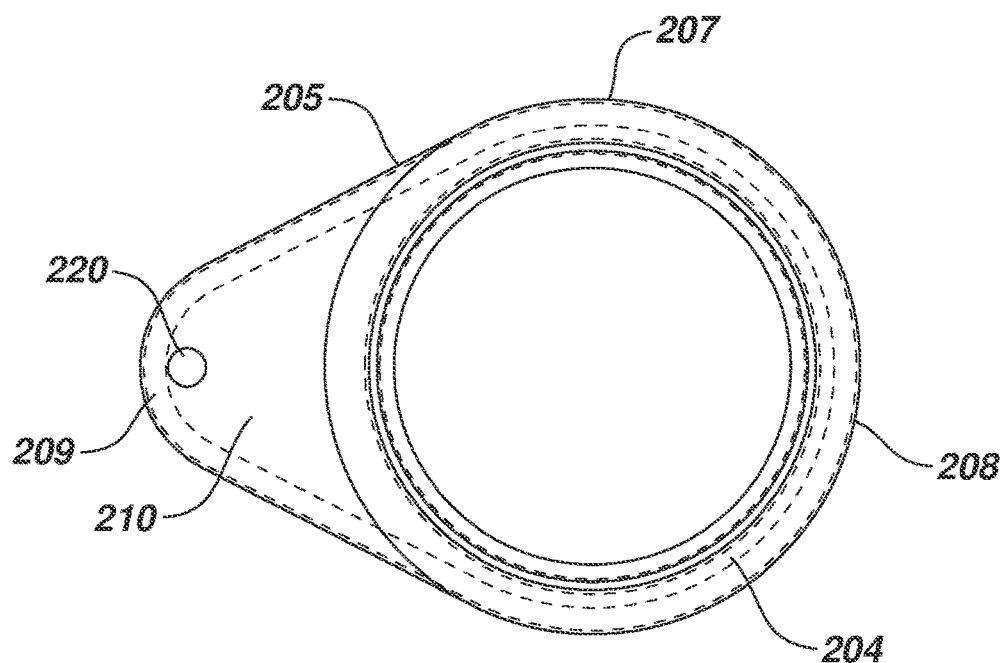
FIG. 2A is a top view drawing of the bowl portion of a contact lens package, made according to the description of the invention contained herein.

Referring to FIG. 2A, the bowl comprises at least one bonding tab 209. The bonding tab 209 may be along the entire peripheral edge 205 of the bowl, as shown along the front, sides 207 and back 208 of FIG. 2A. When the peripheral edge of the bowl is extended outward to form a gate region 210, for the gate 220, the bonding tab 209 is located along the distal edge of the gate region. During molding, the bowl polymer material is introduced to the mold for the bowl region via the gate 220.

When discussing the positioning of the bonding tab; references to the bowl and the peripheral edge of the bowl, also include the gate and peripheral edge of any gate region, when included in the package base.

Figure 2B:
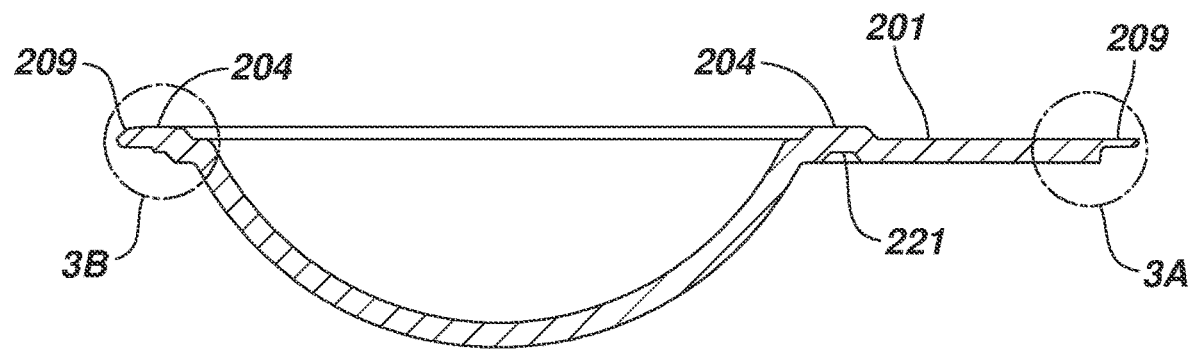
FIG. 2B is a cross-sectional side view of the bowl portion of the contact lens package.

The bonding tabs 209 may be coplanar with the top surface of the bowl 201 along the bowl peripheral edge 205. The bonding tabs may be level with the top of the bowl, or may be offset below the top surface of the bowl, as is shown in FIG. 2B. Offsetting the bonding tab below the top of the bowl may allow the flange material to be molded on the top surface of the bonding tab, while still providing a level surface at the interface between the bowl and flange. The gate region may also be located in the front of the bowl, and may be extended such that the bonding tab 209 along the front of the gate region is located where the user would grip the flange during opening. This configuration provides additional support to the durable injection molded interface during opening. The bonding tab 209 may also be level with the top of the bowl, but undercut on the bottom surface of the bowl, as shown in 3A of FIG. 2B.

Because the first and second materials form a durable thermal bond, mechanical interlocks and encapsulation of the bonding tab is not necessary. Mechanical interlock features, such as a flow through in the gate region, may optionally be added where additional attachment strength is desired. Examples of when higher flexural stress might be anticipated include where the peel strength between the lidstock and bowl is higher or as a result of stresses caused by the packages exposed to high temperatures, such as during steam sterilization. Flexural stress upon package opening is generally concentrated at the front of the package, and it may be desirable to provide a larger bonding tab along the front of contact lens bowl.

In locations along the periphery of the bowl where stresses are lowering during package opening, such as the sides or back of the package, smaller bonding tabs (both in terms of length and width) may be used. Cross-sectional views of examples of bonding tab 209, 309 configurations are shown in FIG. 2B and in cross-sectional expanded views 3A through 3D.

Figure 3A:
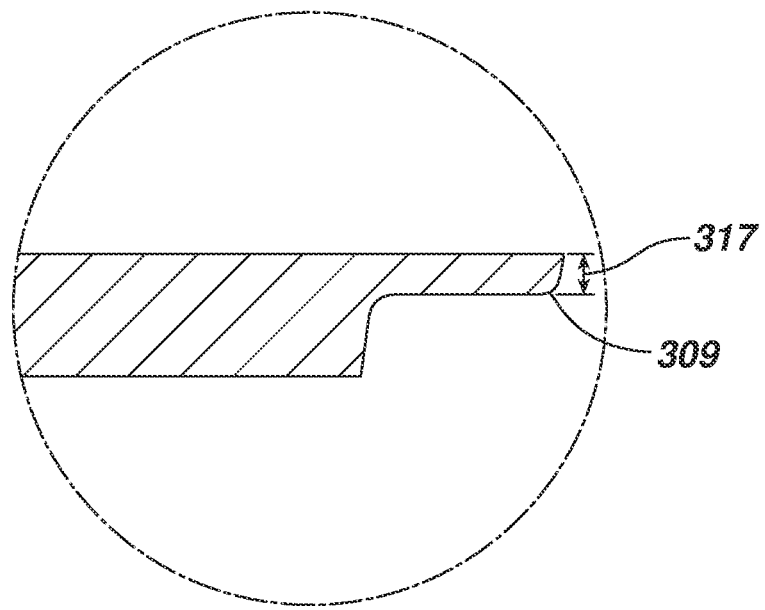
FIGS. 3A-3B are cross-section side views of the bonding tabs of the bowl portions of the contact lens package base labeled 3A and 3B respectively.

FIG. 3A is an expanded view of the bonding tab 309, which would be suitable for use in places where there is sufficient clearance to allow a flat profile tab with an extended width, such as along the peripheral edge at the front of the bowl or gate region. Extended width bonding tabs may also be used in regions of high flexural stress during opening, as they provide a strong thermally durable bond.

Figure 3B:
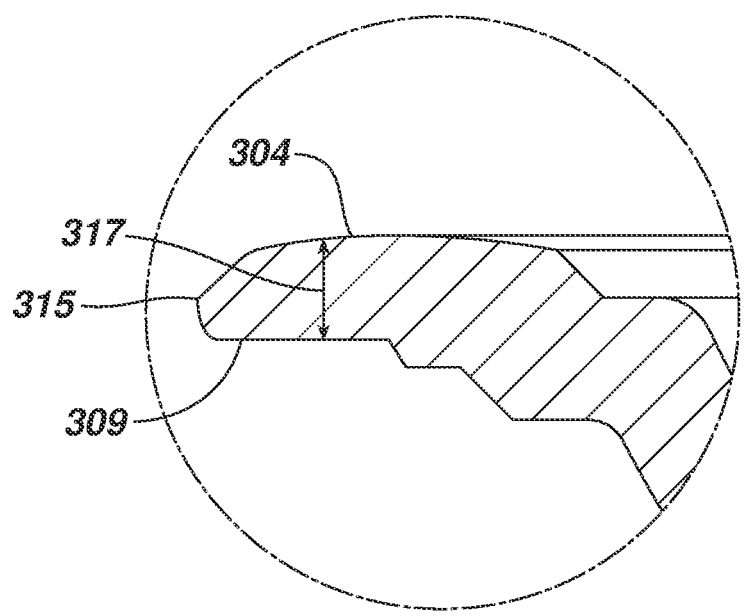
Figure 3C:
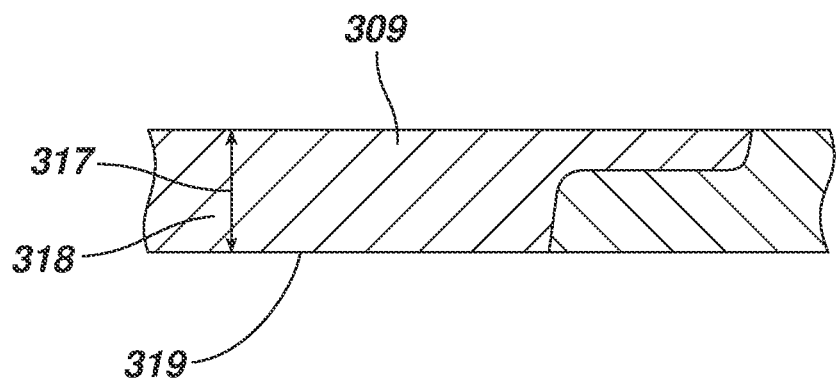
FIGS. 3C-3D are cross-section side views of the interface of the bowl and flange portions of the contact lens package base.

Because the first and second polymer materials form a durable thermal bond, the bonding tab may be located under or adjacent to the seal region, 304, as is shown in FIG. 3B.

Figure 3D:
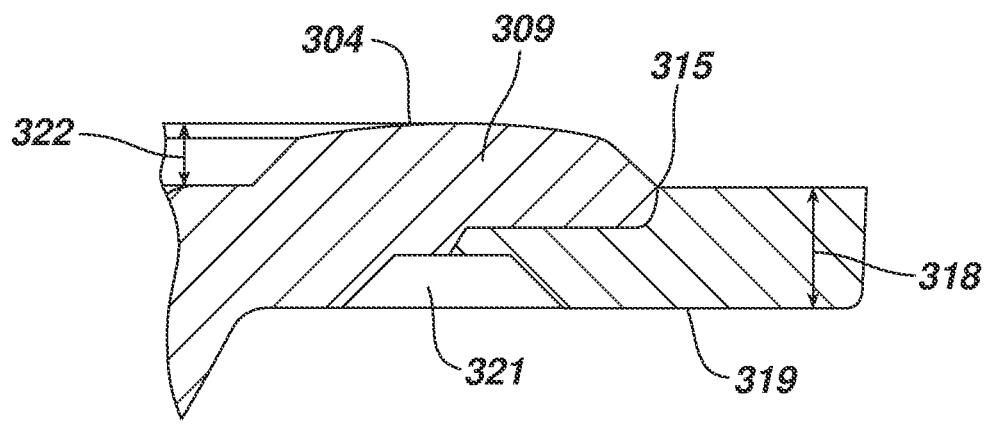

The bonding tab 309 contains the raised seal region 304 and a terminal end 315 shown with a rounded bevel top and bullnose on the bottom. Many other profiles are suitable for the bonding tab and the profile surface may be roughened or irregular to provide greater bonding surface area. The thickness 317 of bonding tab 309 at the interface is less than the bowl thickness, to allow for the second polymer material to make bonding contact. FIG. 3D is an expanded, cross-sectional view of the interface containing bonding tab 309 and the flange bonding overlay 319, shown with opposite diagonal shading. The dimensions of the bonding tabs are disclosed below.

The flange and the bowl preferably have the same or similar thickness to minimize the introduction of stresses, failure points and defects, such sinks to the package. Because the seal region 304 is desirably raised, a core out 321, may be included under the seal region 304. The core out 321 may also be used to maintain uniform or substantially uniform (within about 10%, 5% or 3%) shrinkage in the heat seal region and the interface. The height of the core out 321 should be within about 10%, 5%, 3%, 2%, 1% or the same as the step-up height 322 of the seal region 304.

The width of overlap between the bonding tab and bonding overlay may be between about 1 and about 5 mm where the dimensions of the flange will allow greater overlap (such as the front and back corners in FIG. 1), and between about 1 and about 2 mm overlap when the interface is at or adjacent to the seal region 304. The flow distance for the second polymer material may be selected from about 1 to about 4 mm, about 1 to about 3 mm, and about 1 to about 2 mm.

The width of the bonding tab may be varied along the length to create more bonding surface area, a unique appearance, or a combination thereof.

The lower limit for the thickness 317 of bonding tab 309, and of the bonding overlay 319 may be determined by the ability to get a consistent amount of the respective polymer material to bonding tab and bonding overlay mold cavities during the molding process (moldability lower limit). The thicknesses for both the bonding tab and the bonding overlay should be strong enough to provide a durable injection molded bond that will not fail during package opening. Thickness may also vary across the bonding tab, creating steps or slopes, which can provide additional surface area for bonding. Examples of suitable bonding tab thicknesses 317 include between about 0.3 and about 0.8 mm, or about 0.3 and about 0.6 mm.

The interface thickness 318 should be similar to the thickness of the adjacent areas of the flange and bowl, as sudden changes in profile thickness can lead to sink marks due to shrinkage. It will be appreciated that sink marks can be minimized by smoothing the thickness transition from the interface to the bowl and/or flange, such as by tapering or feathering. In some embodiments, the interface thickness may be up to about 50%, about 30%, about 20%, about 10% or about 5% thicker than either the adjacent flange or bowl region. In some embodiments the interface thickness is the same as the adjacent bowl and flange thicknesses.

It may also be desirable to minimize the total amount of polymer material used in the package to lower the cost of the package and improve sustainability.

Bonding tabs 309 may have a thickness 317 that is between about 20 to about 60%, about 25 to about 55%, about 30 to about 55% of the total interface thickness 318.

The bonding tabs may have a constant width or may have tapered or irregular regions (such as the ends of bonding tabs 209 or a larger width at any location where there is more than 1 mm of space along the flange). Bonding tabs may have widths up to about 5 mm, about 2 mm, up to about 1.5 mm, or ranging between about 0.5 and about 2 mm or about 0.5 and about 1.5 mm.

Benefit of the invention is that the interface can be directly under the heat seal, so bond can be placed in package locations with limited width. Planar bonding tabs 209, such as those shown along the front of bowl portion, may be included along the periphery, in any areas with at least about 1 or about 1.5 mm of width in the flange region. For example, in the package shown in FIG. 1, bonding tabs may be included along the entire periphery, or in the back corners and front of the bowl. Longer or continuous bonding tabs may be preferred over short bonding tabs (teeth), as bonding tabs provide greater surface area for bonding than teeth. A continuous bonding tab may also be preferred esthetically when the flange materials is colored and the bowl material is clear or another color. In one embodiment, the entire bowl periphery has a continuous bonding tab. The bonding tab may be included on about 50 to 100%, about 60 to 100% or about 80 to 100% of the bowl periphery.

The bonding tabs may have a flat profile as shown in FIGS. 3A and C or may vary in thickness as shown in FIGS. 3B and D to provide addition surface area between the first and second polymer materials.

When the bonding tab is not continuous, short bonding tabs or teeth 211 can be located along the peripheral edge 205 of bowl 201, particularly in locations where adding addition material projecting out from peripheral edge 205 may be undesirable, such as on the sides 207 and back 208 of the bowl. Teeth may also be included at the front or back of the package and when included preferably alternate with bonding tabs. The length of the teeth may be determined by the number of teeth included and their location. Teeth may also be included to provide a discontinuous interface esthetic, particularly where the bowl and flange are different, such as a clear bowl and a colored or opaque flange. Examples of suitable dimensions for the teeth include:

|  | mm | |
| --- | --- | --- |
| Length | 1-4 | 2-4 |
| Width | 0.3-2 | 0.3-1 |
| Thickness | 0.3-8 | 0.3-0.6 |

All values are preceded by about, and the ranges can be employed in any combination. The teeth may also have the same thickness as the bonding tabs. The teeth may have a flat profile or may have a variable profile to provide additional surface area for bonding between the first and second polymer materials. The teeth may have straight or rounded edges, which may be perpendicular to the bowl edge, or angled. When angled, an acute angle with respect to the bowl periphery will provide an overhang which can add mechanical strength to the bond.

The package of the present invention is sterilized, usually by terminal heat sterilization (autoclaving). The bowl and lidstock which seals the package must be heat sterilizable and inert to the packing solution and contact lens. Thus, the seal between the lidstock and bowl can be disposed inside the bowl periphery along a seal region 204. This embodiment may be useful where the flange polymer material is either not medical grade (such as recycled polymer materials or some colored polymer materials), where the lidstock seals adequately with the bowl polymer material but not the flange polymer material, or where the flange polymer material or a component thereof is reactive with well contents (packing solution, packing solution additives, the lens or a combination thereof). The seal region 204 can also be located closer to the well, as long as it is inside bowl peripheral edge 205. The seal region may have variety of shapes, such as round, ovoid, polygonal, or rounded polygonal.

The flange, bowl, well and seal region may have the same or different shapes and may be selected from circles, ovals, tear shapes, polygons, rounded polygons and combinations thereof and the like. The flange can have an elongated section at the front to provide space for the fingers to grasp the flange front region upon opening. Generally, the well has rounded sides to receive the contact lens, but the shapes for the bowl and flange may be selected from a variety of shapes to provide the desired esthetic.

The flange may have any shape, including, rectangular, oval, tear shaped, polygonal. The flange may include additional features used in contact lens packaging including textures, gripping features or voids at the front for improved grip during opening, feet or walls on the sides or back to improve stacking or stability when the package rests on a table, cut ins on the sides of the front section of the flange or a downwardly sloping section at the front of the flange.

The bowl and flange polymer materials may be selected from polymers, rubbers, or plastics that can molded and preferably be injection molded and are compatible with the chemical and physical properties of the lens, packing solution and any additives which may be included therein and sterilization requirements of contact lens manufacture, including, for amorphous polymers, a Tg above 120° C., or at or above about 125° C. Tg may be measured via a standard method, such as ASTM D3418-03 "Standard Test Method for Transition Temperatures of Polymer by Differential Scanning calorimetry".

First and second polymer materials are non-reactive with each other. The first polymer material may have a higher molding temperature than the second. The polymer materials used to form the bowl may be transparent. The first polymer material may be selected so that structural strength of first mold part can withstand the pressure and temperature of the second shot molding. The second polymer materials may have a % shrinkage that is less than the first polymer.

When colorants are added, the colorant may be included in the flange polymer material in amounts sufficient to provide the desired color, but in an amount insufficient to make the flange polymer brittle, or which makes all or a part of the interface bond between the bowl and flange separate upon removing the lidstock from the package. Suitable amounts of colorant include up to about 3%, up to about 2%, up to about 1% or between about 0.1 and about 2 wt % or about 0.1 and about 1.5 wt %.

Adding colorants, and particularly colorant packages containing pigments to polymers with crystallinity or formulated to generate crystallinity during molding (such as nucleated polypropylenes), may further increase the brittleness of the polymer. When using such polymers, it may be desirable to use lesser amounts of colorants, especially those containing pigments, or other particulates which can act as nucleating sites, to less than about 2 wt % or less than about 1 wt %. Examples of nucleated polypropylenes include Flint Hills P4H6N-222, Sabic PCGR40. F350 HC2 (high crystallinity homopolymer, MFR=35), from Braskem; *Borealis* RF366MO (random copolymer with nucleating and antistatic agents), BJ380MO (heterophasic copolymer, controlled rheology with nucleating and antistatic agents) from *Borealis*; SABIC 512A (controlled rheology PP homopolymer); Formelene 4142T (nucleated homopolymer) from

*Formosa* Plastics; FHR 11T55V (clarified homopolymer), FHR P4C5N-046 (nucleated homopolymer), FHR P4C6N-041 (nucleated homopolymer) from Flint Hills Resources; and Total PPH10099 (controlled rheology PP homopolymer) from Total Petrochemicals.

Polymers with low or no crystallinity, such as amorphous polypropylene are less prone to brittleness when colorant packages are added, and may permit higher colorant package loadings, such as up to about 2 wt %, or up to about 3 wt %. Examples of amorphous polypropylene include those without clarifying or nucleating agents such as or ACHIEVE 1605 (metallocene catalyzed PP homopolymer) and PP1264E1 (PP homopolymer, MFR=20 g/10 min) from ExxonMobil; Braskem CP360H (homopolymer), Moplen HE649T (homopolymer) and HP301R (homopolymer) from LyondellBasell, Formolene 4111T (homopolymer) from *Formosa* Plastics, Total MR2001 (homopolymer material), and Total M3766 (metallocene catalyzed PP homopolymer). In one embodiment the flange polymer comprises a non-nucleated polypropylene and up to 1% or up to 2% colorant. In another embodiment the bowl material is uncolored polypropylene (either nucleated or non-nucleated) and the flange polymer comprises a non-nucleated polypropylene and up to 1% or up to 2% colorant. In another embodiment the bowl material is uncolored polypropylene (non-nucleated) and the flange polymer comprises a non-nucleated polypropylene and up to 1% or up to 2% colorant. In another embodiment the bowl material comprises an uncolored COP (Cyclic Olefin Polymer), COC (Cyclic Olefin Co-polymers) or a polypropylene COC or COP blend and the flange polymer comprises a COP, COC, PP/COC blend or PP/COP blend and up to 1% or up to 2% colorant.

Semicrystalline materials may have a melting point least 5° higher than the selected autoclaving temperature, or at least about 125° C. Semicrystalline polymer which meets the foregoing properties, including polypropylene, may be used. The bowl polymer material may also be compatible with the inspection equipment requirements of contact lens manufacture. Examples of suitable polymer materials include, without limitation, polysulfone (PSU), polyethersulfone (PESU), polycarbonate (PC), polyetherimide (PEI), polyamides, including nylons, polyolefins including polypropylene, polymethylpentene, (PMP), and olefin co-polymers, including COPs (Cyclic Olefin Polymer) and COCs, (Cyclic Olefin Co-polymers), acrylics, rubbers, urethanes, fluorocarbons, polyoxymethylene, polyvinylchloride (PVC), polyphenylsulfide (PPS), polycarbonate copolymers, polyvinylidene fluoride (PVDF), and the like and copolymers and blends of the foregoing. Blends include polybutylene terephthalate polyester blends, including PBT and PC blends, PC/polyester blends, and polypropylene blended with COPs or COCs.

The bowl polymer material may be any polymer material that can be injection molded, provide a durable thermal bond with the selected flange polymer and provide contact lens packages have a shelf-life of at least one, two, three, four or five years and are compatible with the chemical and physical properties of the lens, packing solution and any additives which may be included therein. The bowl polymer material may be selected from any of the foregoing materials. The bowl polymer material may preferably be polypropylene having a melt temperature greater than about 145° C., COP, COCs and blends of polypropylene blended with COPs or COCs. The bowl polymer may be uncolored. Examples of polypropylenes include metallocene catalyzed polypropylene polymer and co-polymer, Zielgler-Natta catalyzed polypropylene polymer and co-polymer. Examples of suitable grades of polypropylene include ACHIEVE 1605 (metallocene catalyzed PP homopolymer) and PP1264E1 (PP homopolymer, MFR=20 g/10 min) from ExxonMobil; Braskem CP360H (homopolymer), F350 HC2 (high crystallinity homopolymer, MFR=35), from Braskem; *Borealis* RF366MO (random copolymer with nucleating and anti-static agents), BJ380MO (heterophasic copolymer, controlled rheology with nucleating and antistatic agents) from *Borealis*; Moplen HE649T (homopolymer) and HP301R (homopolymer) from LyondellBasell; SABIC 512A (controlled rheology PP homopolymer); Formolene 4111T and Formelene 4142T from *Formosa* Plastics; FHR 11T55V, FHR P4C5N-046, FHR P4C6N-041 from Flint Hills Resources; and Total MR2001 (homopolymer material), Total M3766 (metallocene catalyzed PP homopolymer) and Total PPH10099 (controlled rheology PP homopolymer) from Total Petrochemicals. The polypropylene may have a melt flow range of about 15 g/10 minutes to about 44 g/10 minutes as determined by ASTM D-1238-10 "Standard Test Method for Melt Flow Rates of Thermoplastics by Extrusion Plastometer", or similar known methods. The polypropylene may be pristine, or may have undergone a controlled rheology process to increase its melt flow rate.

The flange polymer material may comprise any of the polymer, copolymer and polymer blends listed above capable of forming a durable injection molded bond with the selected bowl polymer material. In one embodiment the bowl and the flange polymer material comprise the same polymer, except that either the bowl polymer material, the flange polymer material or both include additional components such as colorants. In one embodiment the bowl and the flange polymer material comprise the same polymer, except that the flange polymer material includes additional components such as colorants. As described above, when the flange polymer is colored it may preferably be non-nucleated polypropylene, a COC, COP or a blend of a non-nucleated polypropylene and a COP or COC. The flange polymer material may comprise virgin or recycled polymer and may comprise virgin or recycled polypropylene. An example of a recycled polypropylene which could be used in the flange is PRI-PPHO-BASE polypropylene (reground homopolymer, white or black, with an MFR between 17-22 g/10 min) from Plastic Recycling Inc.

The flange and bowl polymer materials may also comprise additives including colorants, including dyes, pigments, light absorbing compounds, including UV absorbers and HEV absorbers, nucleating agents, antioxidants, clarifiers, thermal stabilizers, tie resins, nano-clays, oxygen scavengers, plasticizers, foaming agents, flame retardants, anti-static agents, anti-fogging agents, anti-blocking agents, lubricants, slip and release agents, stearates, fibers, nano-tubes, stiffening agents and combinations thereof. The polymer materials may comprise virgin polymer, recycled polymer or a combination thereof. The bowl may be formed from virgin polymer and the flange from colored polymer, recycled polymer, blends comprising the foregoing or a combination thereof. The bowl may be formed from transparent and/or colorless material and the flange from colored polymer material, recycled polymer material or a combination thereof. Any color and/or color effect may be used in the flange, including sparkles, pearlescence, marbling, swirling, combinations thereof and the like. The colored flange may be clear or opaque, and may have a consistent or gradated color.

When recycled polymer material is used in the flange it may be used in any convenient amount so long as the flange polymer material has the Tg or melting temperatures described above and can form a durable injection molded thermal bond with the bowl polymer material. The bowl may be formed from polymer material comprising at least one light blocking compound. The bowl and the flange may be formed from the same polymer (such as polypropylene), but may have different additive packages (such as at least one light absorbing compound in the bowl and at least one colorant in the flange). Combinations of any of the foregoing may also be used.

Suitable polymer materials for the bowl and flange polymer materials include, without limitation, including without limitation, ZEONEX™ 690R, Exxon ACHIEVE™ 1605, copolymer of polypropylene and polyethylene, blends such as blends of polypropylene with ZEONEX 690R and the like and combinations thereof.

Cyclic Olefin Polymers are produced by ring-opening metathesis polymerization of various cyclic monomers such as 8, 9, 10-trinorborn-2-ene (norbornene) or 1,2,3,4,4a,5,8, 8a-octa-hydro-1,4,5,8-dimethanonaphthalene (tetracyclododecene) followed by hydrogenation (ARTON from Japan Synthetic Rubber, Zeonex and Zeonor from Zeon Chemicals). Typical chemical structures of COP are listed below

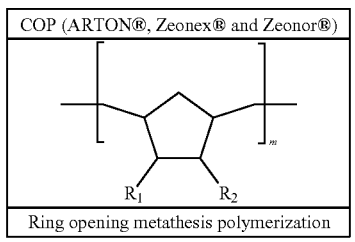

COP plastic resins are commercially available from Zeon Chemicals (Zeonex and Zeonor resins), Polymer and Japan Synthetic Rubber (JSR). COC plastic resins are commercially available from Topas Advanced Polymers (Topas resins) and Mitsui (APEL resins). Specific Examples include Zeonor 1420 and 1600, Zeonex 690R, E48R, 330R, Topas 6013, 6015, 6017; APEL grades APL5013VH, APL5014KL, APL5014XH and JSR ARTON, ARTON D4531, D4532, F5023.

When the first material is used to form the bowl, it can have properties suitable for forming retortable packaging capable of holding liquid for 6 months, a year, two or more years, three or more years, or 5 or more years. Suitable properties can include a water vapor transmission less than about 2.0 g-100 um/(m$^2$-day), MFR of 10 g/10 minutes to about 44 g/10 minutes, and combinations thereof. Water vapor transmission may be measured using ASTM F1249-20, "Standard Test Method for Water Vapor Transmission Rate Through Plastic Film and Sheeting Using a Modulated Infrared Sensor" or other known tests that provide similar values. It should be appreciated that some materials with higher water vapor transmission rates could be used for the bowl, by increasing the thickness of the bowl.

The second polymer material can have similar or different properties. For example, the second polymer material can be transparent, uncolored, opaque, colored, and combinations thereof and may not need to be USP/FDA Compliant as it does not need to come in contact with the packing solution or contact lens (when the heat seal is on the bowl portion of the package). This means that some polymer materials not often used in lens packaging, like polysulfone and some polycarbonates, such as Lexan, could be used as the flange polymer material, so long as they form a durable injection molded thermal bond with the bowl polymer material.

The packages can be molded in several different ways, using a single injection molding machine with a single molding station, and for example rotating platens, a single molding machine with multiple molding stations or different machines, such as insert molding. The present invention also comprises a method for molding a lens package comprising injection molding a first polymer material to form a bowl comprising
  a well for holding a lens,
  a well edge, a heat seal region outside the well edge and a peripheral edge outside the heat seal region, the bowl having at least one bonding tab along at least a portion of the peripheral edge; and
injection molding a second polymer material to form a flange comprising a bonding overlay which is durably thermally bonded to the interface tab at an interface.

The packages of the invention preferably are used to store lenses, contact lenses, or soft contact lenses, including conventional or silicone hydrogel contact lenses. The lenses may include additional functionality or components such as nutriceutical and pharmaceutical agents (OTC or prescription), wetting agents, beauty or cosmetic lenses which comprise patterns, prints, cosmetic effects and combinations thereof, light absorbing compounds including static dyes such as UV, visible or HEV absorbing compounds, and dynamic light absorbing compounds including photochromic compounds which reversibly change light and liquid crystal polymer materials. The bowl of the package may be inert to any components not bound into the contact lens polymer (by any means including, but not limited to ionic or covalent bonding, steric interactions or entrapment) such as nutriceutical and pharmaceutical agents (OTC or prescription) and wetting agents. When such components are included in the packaging solution or elute from the contact lens during storage, the polymer used for the bowl absorbs less than about 5%, about 4% about 3% or about 2% of the non-bound component.

The bowl polymer may further comprise UV or HEV absorbing compounds to to photostabilize photosensitive contact lenses contained therein, such as lenses containing photochromic or HEV absorbing compounds. The flange could be made from a virgin or recycled polymer without a UV or HEV absorbing compound.

It will be appreciated that the embodiments illustrated and described herein are among myriad embodiments of bowl-flange arrangements within the scope of the invention as set forth in the appended claims.

The foregoing description, for purposes of explanation, used specific nomenclature to provide a thorough understanding of the described embodiments, such that others can, by applying knowledge within the skill of the art, readily modify and/or adapt for various applications such specific embodiments, without undue experimentation, and without departing from the general concept of the present invention. However, it will be apparent to one skilled in the art that many of the specific details may not be required to practice the described embodiments. Thus, the descriptions of the specific embodiments described herein are presented for the purposes of illustration. They are not targeted to be exhaustive or to limit the embodiments to the precise forms disclosed.

It will be apparent to one of ordinary skill in the art that many modifications and variations are possible in view of the above teachings. Such variations and modifications are intended to be within the meaning and range of equivalents of the disclosed embodiments, based on the teaching and guidance presented herein. The breadth and scope of the present invention should not be limited by any of the above-described embodiments but should be defined only in accordance with the following claims and their equivalents.

EMBODIMENTS

1. A package comprising:
   a package base comprising a bowl comprising
   a well for holding a lens,
   a well edge, a heat seal region outside the well edge and a peripheral edge outside the heat seal region, the bowl having at least one bonding tab along at least a portion of the peripheral edge; and
   a flange comprising a bonding overlay which is durably thermally bonded to the interface tab at an interface.
2. The package of embodiment 1 wherein the at least one bonding tab comprises a single continuous tab around and/or under the peripheral edge of the bowl.
3. The package of any of the foregoing claims comprising a planar region extending from a portion of the heat seal region to the peripheral edge of the bowl.
4. The package of any of the foregoing claims wherein the planar region extends from the bowl toward a front portion of the flange.
5. The package of any of the foregoing embodiments wherein the planar region may be gripped during removal of a lidstock sealed to the bowl along the heat seal region.
6. The package of any of the foregoing embodiments wherein a top surface of at least a portion of the bonding tab is coplanar with a top surface of the planar region.
7. The package of any of the foregoing embodiments claim 3 wherein a top surface of at least a portion of the bonding tab is offset from a top surface of the planar region.
8. The package of any of the foregoing embodiments wherein the bonding tab is offset below a top surface of at least a portion of the bowl.
9. The package of any of the foregoing embodiments wherein the bonding tab is free of mechanical interlocks.
10. The package of any of the foregoing embodiments wherein at least a portion of the interface tab has a width of up to about 5 mm, up to about 2 mm, or up to about 1.5 mm.
11. The package of any of the foregoing embodiments wherein the at least one interface tab has a width of between about 0.5 and about 2 mm or about 0.5 and about 1.5 mm.
12. The package of any of the foregoing embodiments wherein the at least one interface tab is included about 50 to 100%, about 60 to 100% or about 00 to 100% of the bowl peripheral edge.
13. The package of any of the foregoing embodiments wherein the interface tab wherein at least a portion of the bonding tab is disposed under the heat seal.
14. The package of any of the foregoing embodiments wherein a portion of the bonding tab is disposed along the bowl peripheral edge of the peripheral region and a portion of the bonding tab is disposed under the heat seal.
15. The package of any of the foregoing embodiments wherein the interface tab is included along the entire bowl peripheral edge.
16. The package of any of the foregoing embodiments wherein the top surface of the bonding tab is coplanar with the planar region along a front bowl section and under the heat seal region along back and side bowl sections.
17. The package of any of the foregoing embodiments wherein the flange and the bowl have similar thicknesses.
18. The package of any of the foregoing embodiments wherein the flange and the bowl thicknesses are within 10% or 5% of each other.
19. The package of any of the foregoing embodiments wherein the bonding tab has a roughened surface along the interface.
20. The package of any of the foregoing embodiments wherein the bonding tabs have a thickness that is thinner than the flange thickness.
21. The package of any of embodiments 20 wherein the at least one bonding tab has a thickness that is between about 20 to about 60%, about 25 to about 55%, about 30 to about 55% of the total thickness of the interface.
22. The package of any of the foregoing embodiments wherein the bonding tabs have a thickness between about 0.3 and about 0.8 mm, about 0.3 and about 0.6 mm.
23.
The package of any of the foregoing embodiments wherein the heat seal is a raised surface above a top surface of the bowl, further comprising a core out below the heat seal to maintain substantially uniform thickness of the heat seal region and the bowl.
24. The package of embodiment 23 wherein the core out has a height within about 10% or about 5% of a height the heat seal is raised above the bowl top surface.
25. The package of any of the foregoing embodiments wherein the bonding tab and bonding overlay contact at the interface is between about 1 and about 5 mm.
26. The package of embodiment 13 wherein the portion of the bonding tab located under the heat seal and the bonding overlay contact at the interface is between about 1 and about 2 mm.
27. The package of any of the foregoing embodiments wherein the bowl region and the flange region are formed from a bowl polymer material and a second polymer material, respectively.
28. The package of any of the foregoing embodiments wherein the bonding tab and the bonding overlay have thickness at the interface within about 30%, about 25% or about 10% of each other.
29. The package of any of the foregoing embodiments further comprising one or more teeth disposed on the bowl periphery.
30. The package of embodiment 29 wherein the interface tabs and teeth alternate around the bowl periphery.
31. The package of embodiments 29 or 30 wherein the teeth at the back or sides of the bowl periphery.
32. The package of embodiments 29-31 where the teeth are disposed between interface tabs.
33. The package of embodiments 29-32 wherein the teeth have a flat profile.
34. The package of embodiments 29-32 wherein the teeth are thicker at a distal end.
35. The package of embodiments 29-34 wherein the teeth have a length between about 1 to about 4 mm or about 2 to about 4 mm.

36. The package of embodiments 29-35 wherein the teeth have a width between about 0.3 and about 2 mm or about 0.3 and about 1 mm.
37. The package of embodiments 29-35 wherein the teeth have a thickness between about 0.3 and about 0.8 mm and about 0.3 and about 0.6 mm.
38. The package of any of the foregoing embodiments wherein the bowl polymer material is transparent and the second polymer material is selected from colored polymer material, opaque polymer material, recycled polymer material, and combinations thereof.
39. The package of embodiment 38 wherein the bowl polymer material is selected from transparent polymer material, virgin polymer material, colored polymer material, polymer material comprising at least one light absorbing compound, and combinations thereof.
40. The package of embodiment 38 wherein the bowl polymer material is transparent and the second polymer material is colored.
41. The package of embodiment 38 wherein the bowl polymer material is virgin polymer material and the second polymer material comprises recycled polymer material.
42. The package of any of the foregoing embodiments wherein the bowl polymer material, the flange polymer material or both may comprise at least one additive independently selected from the group consisting of colorants, including dyes, pigments, light absorbing compounds, including UV absorbers and HEV absorbers, nucleating agents, antioxidants, clarifiers, thermal stabilizers, tie resins, nano-clays, oxygen scavengers, plasticizers, foaming agents, flame retardants, anti-static agents, anti-fogging agents, anti-blocking agents, lubricants, slip and release agents, stearates, fibers, nanotubes, stiffening agents and combinations thereof.
43. The package of any of the foregoing embodiments wherein the bowl polymer and flange polymer materials comprise polypropylene.
44. The package of any of the foregoing embodiments wherein the bowl polymer has a water vapor transmission less than about 2.0 g-100 um/(m$^2$-day), MFR of 10 g/10 minutes to about 44 g/10 minutes, and combinations thereof.
45. The package of any of the foregoing embodiments further comprising a lidstock sealed to the package base to enclose the well and hold the lens between said bowl and the film.
46. The package embodiment 45 wherein the lidstock is sealed to the bowl.
47. The package of any of the preceding embodiments wherein the flange extends laterally from the bowl peripheral edge.
48. The package of any of the preceding embodiments wherein the package is autoclavable.
49. The package of any of the foregoing embodiments wherein the bowl polymer material comprises at least one polymer selected from the group consisting cycloolefin polymers, cycloolefin copolymers and blends thereof, and the flange polymer material is selected from virgin or recycled polypropylene having a melt temperature greater than about 145° C.
50. The package of embodiment 49 wherein the flange polymer material comprises up to about 3%, up to about 2%, up to about 1% or between about 0.1 and about 2 wt % or about 0.1 and about 1.5 wt % colorant.
51. A process for forming a package base comprising injection molding a bowl from a bowl polymer material, the bowl comprising
a well for holding a lens,
a well edge, a heat seal region outside the well edge and a peripheral edge outside the heat seal region, the bowl having at least one bonding tab along at least a portion of the peripheral edge; and
injection molding a flange from a flange polymer material such that the flange polymer material contacts the interface tab forming a bonding overlay which is durably thermally bonded to the interface tab at an interface.

What is claimed is:
1. A package comprising:
a package base comprising a bowl comprising
a well for holding a lens,
a well edge, a heat seal region outside the well edge and a peripheral edge outside the heat seal region, the bowl having at least one bonding tab along at least a portion of the peripheral edge; and
a flange comprising a bonding overlay which is durably thermally bonded to the bonding tab at an bonding.
2. The package of claim 1 wherein the at least one bonding tab comprises a single continuous tab around and/or under the peripheral edge of the bowl.
3. The package of claim 1 comprising a planar region extending from a portion of the heat seal region to the peripheral edge of the bowl.
4. The package of claim 3 wherein the planar region extends from the bowl toward a front portion of the flange.
5. The package of claim 3 wherein the planar region may be gripped during removal of a lidstock sealed to the bowl along the heat seal region.
6. The package of claim 3 wherein a top surface of at least a portion of the bonding tab is coplanar with a top surface of the planar region.
7. The package of claim 3 wherein a top surface of at least a portion of the bonding tab is offset from a top surface of the planar region.
8. The package of claim 3 wherein the bonding tab is offset below a top surface of at least a portion of the bowl.
9. The package of claim 1 wherein the bonding tab is free of mechanical interlocks.
10. The package of claim 1 wherein at least a portion of the bonding tab has a width of up to about 5 mm, up to about 2 mm, or up to about 1.5 mm.
11. The package of claim 1 wherein the at least one bonding tab has a width of between about 0.5 and about 2 mm or about 0.5 and about 1.5 mm.
12. The package of claim 1 wherein the at least one bonding tab is included on about 50 to 100%, about 60 to 100% or about 00 to 100% of the bowl peripheral edge.
13. The package of claim 1 wherein at least a portion of the bonding tab is disposed under the heat seal region.
14. The package of claim 3 wherein a portion of the bonding tab is disposed along the peripheral edge of the bowl and a portion of the bonding tab is disposed under the heat seal.
15. The package of claim 3 wherein the bonding tab is included along the entire peripheral edge of the bowl.
16. The package of claim 6 wherein the top surface of the bonding tab is coplanar with the planar region along a front bowl section and under the heat seal region along back and side bowl sections.
17. The package of claim 12 wherein the flange and the bowl have similar thicknesses.

18. The package of claim 17 wherein the flange and the bowl thicknesses are within 10% or 5% of each other.

19. The package of any one of the foregoing claims wherein the bonding tab has a roughened surface along the interface.

20. The package of claim 1 wherein the bonding tabs has a thickness that is thinner than the flange thickness.

21. The package of claim 1 wherein the at least one bonding tab has a thickness that is between about 20 to about 60%, about 25 to about 55%, about 30 to about 55% of a total thickness of the interface.

22. The package of claim 1 wherein the bonding tabs have a thickness between about 0.3 and about 0.8 mm, about 0.3 and about 0.6 mm.

23. The package of claim 1 further comprising a heat seal as a raised surface in the heat seal region and above a top surface of the bowl, further comprising a core out below the heat seal to maintain substantially uniform thickness of the heat seal region and the bowl.

24. The package of claim 23 wherein the core out has a height within about 10% or about 5% of a height the heat seal is raised above the top surface of the bowl.

25. The package of claim 1 wherein the bonding tab and bonding overlay contact at the interface is between about 1 and about 5 mm.

26. The package of claim 13 wherein the portion of the bonding tab located under the heat seal region and the bonding overlay contact at the interface is between about 1 and about 2 mm.

27. The package of claim 1 wherein the bowl region and the flange region are formed from a bowl polymer material and a second polymer material, respectively.

28. The package of claim 1 wherein the bonding tab and the bonding overlay have thickness at the interface within about 30%, about 25% or about 10% of each other.

29. The package of claim 1 further comprising one or more teeth disposed on the bowl periphery.

30. The package of claim 29 wherein the interface tabs and teeth alternate around the bowl periphery.

31. The package of claim 29 wherein the teeth are disposed at the back or sides of the bowl periphery.

32. The package of claim 29 where the teeth are disposed between interface tabs.

33. The package of claims 29, 30, 31 or 32 wherein the teeth have a flat profile.

34. The package of claims 29, 30, 31 or 32 wherein the teeth are thicker at a distal end.

35. The package of claims 29, 30, 31 or 32 wherein the teeth have a length between about 1 to about 4 mm or about 2 to about 4 mm.

36. The package of claims 29, 30, 31 or 32 wherein the teeth have a width between about 0.3 and about 2 mm or about 0.3 and about 1 mm.

37. The package of claims 29, 30, 31 or 32 wherein the teeth have a thickness between about 0.3 and about 0.8 mm and about 0.3 and about 0.6 mm.

38. The package of claim 27 wherein the bowl polymer material is transparent and the second polymer material is selected from colored polymer material, opaque polymer material, recycled polymer material, and combinations thereof.

39. The package of claim 38 wherein the bowl polymer material is selected from transparent polymer material, virgin polymer material, colored polymer material, polymer material comprising at least one light absorbing compound, and combinations thereof.

40. The package of claim 38 wherein the bowl polymer material is transparent and the second polymer material is colored.

41. The package of claim 38 wherein the bowl polymer material is virgin polymer material and the second polymer material comprises recycled polymer material.

42. The package claim 38 wherein the bowl polymer material, the second polymer material or both may comprise at least one additive independently selected from the group consisting of colorants, including dyes, pigments, light absorbing compounds, including UV absorbers and HEV absorbers, nucleating agents, antioxidants, clarifiers, thermal stabilizers, tie resins, nano-clays, oxygen scavengers, plasticizers, foaming agents, flame retardants, anti-static agents, anti-fogging agents, anti-blocking agents, lubricants, slip and release agents, stearates, fibers, nanotubes, stiffening agents and combinations thereof.

43. The package of claim 27 wherein the bowl polymer and second polymer materials comprise polypropylene.

44. The package of claim 27 wherein the bowl polymer has a water vapor transmission less than about 2.0 g-100 um/(m$^2$-day), MFR of 10 g/10 minutes to about 44 g/10 minutes, and combinations thereof.

45. The package of claim 1 further comprising a lidstock sealed to the package base to enclose the well and hold the lens between said bowl and the lidstock.

46. The package of claim 32 wherein the lidstock is sealed to the bowl.

47. The package of claim 1 wherein the flange extends laterally from the bowl peripheral edge.

48. The package of claim 1 wherein the package is autoclavable.

49. The package of claim 27 wherein the bowl polymer material comprises at least one polymer selected from the group consisting cycloolefin polymers, cycloolefin copolymers and blends thereof, and the flange polymer material is selected from virgin or recycled polypropylene having a melt temperature greater than about 145° C.

50. The package of claim 49 wherein the second polymer material comprises up to about 3%, up to about 2%, up to about 1% or between about 0.1 and about 2 wt % or about 0.1 and about 1.5 wt % colorant.

51. A process for forming a package base comprising
injection molding a bowl from a bowl polymer material, the bowl comprising
a well for holding a lens,
a well edge, a heat seal region outside the well edge and a peripheral edge outside the heat seal region, the bowl having at least one bonding tab along at least a portion of the peripheral edge; and
injection molding a flange from a flange polymer material such that the flange polymer material contacts the bonding tab forming a bonding overlay which is durably thermally bonded to the bonding tab at an interface.

* * * * *

UNITED STATES PATENT AND TRADEMARK OFFICE
CERTIFICATE OF CORRECTION

| | | |
|---|---|---|
| PATENT NO. | : 12,396,534 B2 | Page 1 of 1 |
| APPLICATION NO. | : 17/934286 | |
| DATED | : August 26, 2025 | |
| INVENTOR(S) | : Gooch et al. | |

It is certified that error appears in the above-identified patent and that said Letters Patent is hereby corrected as shown below:

In the Claims

Please correct Claim 1, Column 18, Line 23:
From:
" . . . thermally bonded to the bonding tab at an bonding."
To read:
-- . . . thermally bonded to the bonding tab at an interface. --

Signed and Sealed this
Twenty-first Day of October, 2025

John A. Squires
*Director of the United States Patent and Trademark Office*